United States Patent
Tan et al.

(10) Patent No.: US 7,469,839 B2
(45) Date of Patent: Dec. 30, 2008

(54) REFLECTIVE OPTICAL ENCODER

(75) Inventors: Boon Keat Tan, Penang (MY); Kheng Hin Toh, Penang (MY); Susan Hunter, Fort Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 11/226,681

(22) Filed: Sep. 14, 2005

(65) Prior Publication Data

US 2007/0057058 A1 Mar. 15, 2007

(51) Int. Cl.
*G06K 19/06* (2006.01)

(52) U.S. Cl. ...................... 235/494; 235/454

(58) Field of Classification Search .............. 235/454, 235/494
See application file for complete search history.

(56) References Cited

U.S. PATENT DOCUMENTS

| | | | |
|---|---|---|---|
| 4,096,383 A | | 6/1978 | Mancini et al. |
| 4,266,125 A | | 5/1981 | Epstein et al. |
| 4,691,101 A | * | 9/1987 | Leonard ............... 250/231.16 |
| 5,006,703 A | * | 4/1991 | Shikunami et al. ..... 250/231.13 |
| 5,179,485 A | | 1/1993 | Tamayama |
| 5,646,730 A | * | 7/1997 | Mitchell et al. ............. 356/499 |
| 6,043,483 A | | 3/2000 | Schreiber |
| 6,232,593 B1 | | 5/2001 | Taniguchi et al. |
| 6,639,206 B1 | * | 10/2003 | Rothamel et al. ...... 250/231.13 |
| 6,768,101 B1 | | 7/2004 | Lee et al. |
| 6,774,355 B2 | | 8/2004 | Kudo |
| 6,816,091 B1 | | 11/2004 | Chee |
| 7,132,647 B2 | | 11/2006 | Atsuta et al. |
| 2002/0074487 A1 | | 6/2002 | Ito et al. |
| 2003/0085345 A1 | | 5/2003 | Franklin et al. |
| 2004/0155178 A1 | | 8/2004 | Takeshi |
| 2005/0099911 A1 | | 5/2005 | Hiratsuka |
| 2005/0258986 A1 | * | 11/2005 | Hare et al. .................... 341/50 |
| 2007/0018084 A1 | | 1/2007 | Shimomura et al. |

FOREIGN PATENT DOCUMENTS

| | | |
|---|---|---|
| JP | 63-151807 A | 6/1988 |
| JP | 2-176419 A | 7/1990 |

(Continued)

OTHER PUBLICATIONS

"HD2.0 Heavy Duty Optical Encoder", Encoder Technology, www.encodertech.com, Dec. 2004, 2 pages.

(Continued)

*Primary Examiner*—Michael G Lee
*Assistant Examiner*—Kristy A Haupt

(57) ABSTRACT

In one embodiment, an optical encoder includes a code member, a light source, and a detector array. The code member has a plurality of reflectors thereon; and the light source is positioned to illuminate an area of the code member that includes at least one of the reflectors. The detector array includes at least one detector set, each of which includes a plurality of detector elements. The code member and the detector array are moveable with respect to one another along a displacement direction, and as the code member moves with respect to the detector array, the reflectors on the code member reflect light emitted by the light source to produce circular or elliptical light spots that travel across the detector array.

27 Claims, 7 Drawing Sheets

FOREIGN PATENT DOCUMENTS

| | | |
|---|---|---|
| JP | 4-355325 A | 12/1992 |
| JP | 8-247792 A | 9/1996 |
| JP | 10-78332 A | 3/1998 |
| JP | 2000-241441 A | 9/2000 |

OTHER PUBLICATIONS

"Shadow Technology", Quantum Devices, Inc., Quantum Facts Series: QF3-01, www.quantumdev.com, 1998, 2 pages.

"HD2.0/HD2.5 Industrial Encoder Design Points", Encoder Technology, www.encodertech.com, at least as early as Aug. 16, 2005, 2 pages.

Boon Keat Tan, et al., "Transmissive Optical Encoder", Patent Application (22 pages including 15 pages of specification, 6 pages of claims and 1 page abstract), and four sheets of Formal Drawings (Figs. 1-8), Filing Date: Sep. 14, 2005.

Krishnan, Ram S., et al., "A Miniature Surface Mount Reflective Optical Shaft Encoder", *Hewlett-Packard Journal*, (Dec. 1996).

UK Search Report dated Jan. 16, 2007 involving UK counterpart application No. GB0617913.9.

* cited by examiner

REFLECTIVE OPTICAL ENCODER

BACKGROUND

The motion of a moveable component (e.g., the direction and rate of movement of the moveable component) can often be characterized by means of an optical encoder. In the case of an absolute optical encoder, or an optical encoder that has been initially calibrated to a known position, an optical encoder can also be used to characterize the position of a moveable component.

Although optical encoders may take various forms, most can be characterized as linear or rotary. As their respective names imply, linear encoders are used to provide an indication of linear motion (and sometimes position), whereas rotary encoders are used to provide an indication of rotary motion (and sometimes position).

Most optical encoders can also be characterized as transmissive or reflective. In a transmissive optical encoder, a light source and a photodetector are positioned on opposite sides of a code member (e.g., a code strip or a code wheel). As the code member is moved by a movable component, a plurality of windows in the code member cause the photodetector to be illuminated with a varying pattern of light, which pattern can then be correlated with the motion of the moveable component. In a reflective optical encoder, a light source and a photodetector are positioned on the same side of a code member. Then, as the code member is moved by a moveable component, a plurality of reflectors on the code member causes the photodetector to be illuminated with a varying pattern of light.

SUMMARY OF THE INVENTION

In one embodiment, an optical encoder comprises a code member, a light source and a detector array. The code member has a plurality of reflectors thereon; and the light source is positioned to illuminate an area of the code member comprising at least one of the reflectors. The detector array comprises at least one detector set, each of which comprises a plurality of detector elements. The code member and the detector array are moveable with respect to one another along a displacement direction, and as the code member moves with respect to the detector array, the reflectors on the code member reflect light emitted by the light source to produce circular or elliptical light spots that travel across the detector array.

In another embodiment, an optical encoder comprises a code member, a light source, a detector array, and first and second adders. The code member has a plurality of reflectors thereon; and the light source is positioned to illuminate an area of the code member comprising at least one of the reflectors. The detector array comprises at least one detector set, with a first of the detector sets comprising first, second, third and fourth detector elements positioned in adjacent relationship. The code member and the detector array are moveable with respect to one another along a displacement direction, and as the code member moves with respect to the detector array, the reflectors on the code member reflect light emitted by the light source to produce circular or elliptical light spots that travel across the detector array. The first adder is operatively associated with the first detector element and the third detector element to subtract an output signal produced by the third detector element from an output signal produced by the first detector element, thereby generating a first output. The second adder is operatively associated with the second detector element and the fourth detector element to subtract an output signal produced by the fourth detector element from an output signal produced by the second detector element, thereby generating a second output.

In yet another embodiment, a method comprises 1) providing a code member having a plurality of reflectors thereon; 2) positioning a light source on one side of the code member, the light source producing a beam of light that illuminates an area of the code member comprising at least one of the reflectors; and 3) positioning a detector array on a same side of the code member as the light source. The detector array comprises at least one detector set; and each detector set comprising at least four detector elements. The detector array is moveable with respect to the code member along a displacement direction, and as the code member moves with respect to the detector array, the reflectors on the code member produce circular or elliptical light spots that travel across the detector array. The method further comprises combining output signals from at least a first pair of non-adjacent detector elements of the detector array to produce a first quasi-sinusoidal signal.

Other embodiments are also disclosed.

BRIEF DESCRIPTION OF THE DRAWINGS

Illustrative and exemplary embodiments of the invention are shown in the drawings, in which:

FIG. 6(*b*) is a schematic representation of the path of the FIG. 1 light spot along a displacement direction that is inclined with respect to the width dimension of the detector array;

DETAILED DESCRIPTION

Figure 1:
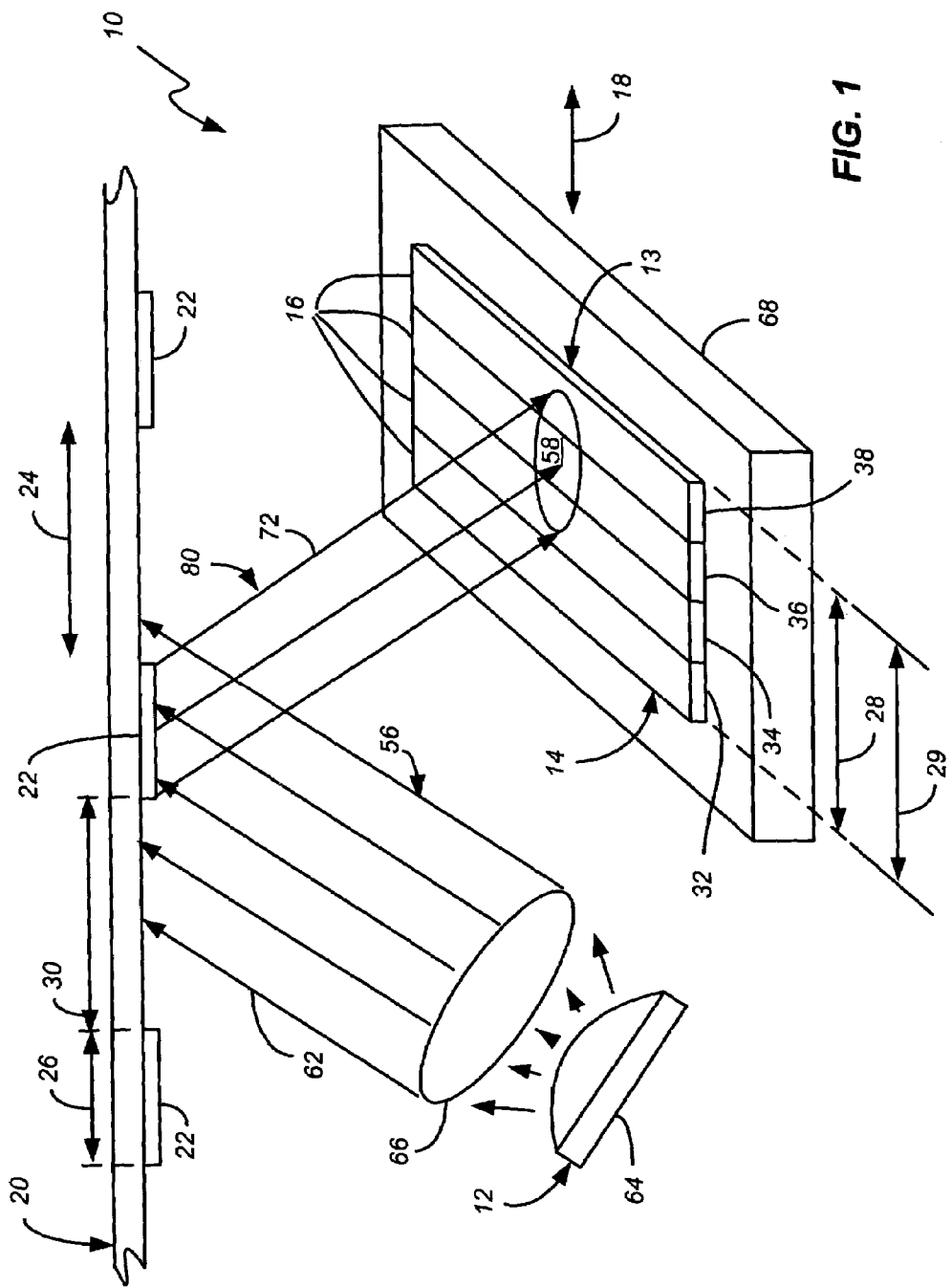
FIG. 1 is a perspective view of a first exemplary optical encoder, wherein the encoder has a detector array comprising a single detector set.

An exemplary optical encoder 10 is shown in FIG. 1 and comprises a light source 12, a detector array 13 and a code member 20. The light source 12 may comprise any of a wide range of light sources suitable for producing light 56 that is detectable by the detector elements 16 forming the detector array 13. It is generally preferred, but not required, that the light source 12 produce a collimated, or substantially collimated, beam 62 of light 56. Such a collimated beam 62 may be produced by the light source 12, or may be formed with the aid of a separate collimating lens 66.

By way of example, in one embodiment, the light source 12 comprises a light emitting diode 64. In some cases, the light emitting diode 64 might be provided with an integral collimating lens (not shown).

The light source 12 may be mounted to a frame or housing (not shown) suitable for holding the light source 12 in spaced-apart relation to the code member 20. Although the light source 12 is shown to be mounted at an angle with respect to the code member 20, the light source 12 could also be mounted parallel to the code member 20. In the latter case, it is preferable that the light source 12 and/or an integral or separate collimating lens 66 be capable of collimating the light 56 in a beam 62 that illuminates the code member 20 at an angle ($\alpha$). Because various mounting arrangements of the light source 12 could be easily provided by persons having ordinary skill in the art after having become familiar with the teachings provided herein, the mounting arrangement of the light source 12 will not be described in further detail herein.

The detector array 13 is also positioned in spaced-apart relation to the code member 20, on the same side of the code member 20 as the light source 12, and comprises at least one detector set 14. By way of example, FIG. 1 shows the detector array 13 to comprise a single detector set 14. However, additional detector sets may be provided, as will be described in greater detail later in this description.

Regardless of the number of detector sets 14 in the detector array 13, each detector set 14 comprises a plurality of individual detector elements 16 that are positioned in a side-by-side adjacent relationship along the width direction 18 of the detector array 13. See FIG. 1. By way of example, the detector set 14 comprises four (4) individual detector elements 16: a first detector element 32, a second detector element 34, a third detector element 36, and a fourth detector element 38. However, in alternate embodiments, the detector set 14 could comprise more than four (4) individual detector elements 16. Together, the detector elements 32, 34, 36, and 38 of the detector set 14 define a width 28 of the detector set 14.

The individual detector elements 16 (e.g., first, second, third, and fourth detector elements 32, 34, 36, and 38) may comprise any of a wide range of devices suitable for detecting the light 56 produced by the light source 12. However, by way of example, and in one embodiment, the various individual detector elements 16 forming the detector set 14 comprise photodiodes.

The various individual detector elements 16 may be mounted to any of a wide variety of structures, such as a printed circuit board 68, suitable for holding the various detector elements 16 at the proper positions along the width direction 18 to form the detector set 14. Alternately, other mounting arrangements are possible, as would become apparent to persons having ordinary skill in the art after having become familiar with the teachings provided herein.

It should be noted that in the embodiment illustrated in FIG. 1, wherein the detector array 13 comprises a single detector set 14, the width 29 of the detector array 13 will be the same as the width 28 of the detector set 14. However, this will not be the case if the detector array 13 comprises more than one detector set 14. For example, and as will be described with reference to an embodiment of an optical encoder 110 illustrated in FIG. 7, if a detector array 113 comprises two detector sets 114, then the width 129 of the detector array 113 will be twice the width 128 of the detector set 114. In some cases, and as will be discussed later in this description, the width 29 of the detector array 13 may be used to determine the sizes and spacing of reflectors 22 on the code member 20.

The code member 20 and the detector array 13 are mounted in moveable relation with respect to one another (e.g., along a displacement direction 24). The side of the code member 20 facing the light source 12 and the detector array 13 is provided with a plurality of reflectors 22 that are positioned to reflect some of the light 56 produced by the light source 12 onto the detector array 13 as the code member 20 moves in relation to the detector array 13. As shown in FIG. 1, the reflected light 80 illuminates the detector array 13 in the form of a plurality of light spots 58, each of which travels across the detector array 13 in response to movement of the code member 20.

In one arrangement, the code member 20 may be mounted to a moveable component (not shown), and the light source 12 and detector array 13 may be fixed in stationary positions. In another arrangement, the code member 20 may be fixed, and the light source 12 and detector array 13 may be mounted to a moveable component. Regardless of the particular arrangement, the optical encoder 10 detects the relative movement between the code member 20 and the detector array 13.

Figure 2:
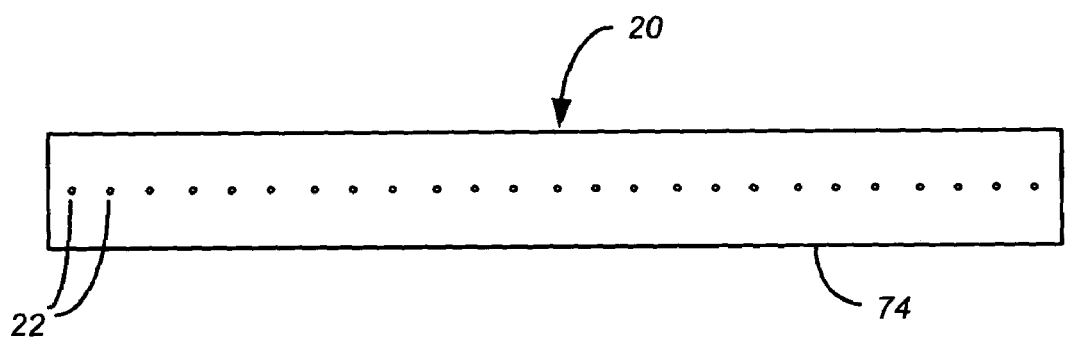
FIG. 2 is a plan view of a code strip that may be utilized with the optical encoder of FIG. 1.
Figure 3:
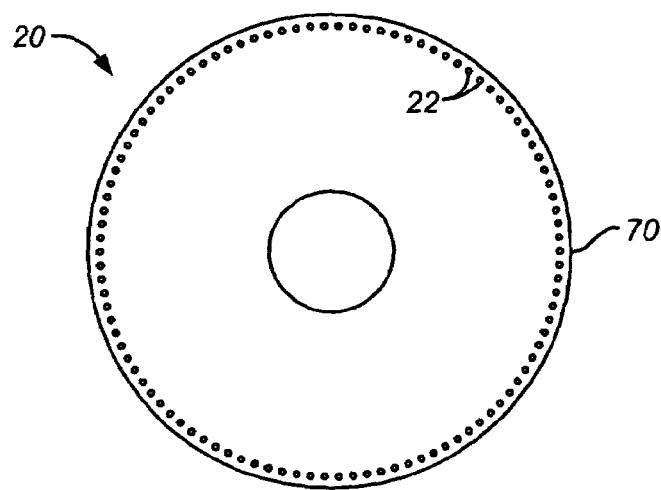
FIG. 3 is a plan view of a code wheel that may be utilized with the optical encoder of FIG. 1.

The code member 20 may take on any of a wide range of forms or configurations, depending on its application. For example, if the optical encoder 10 is to be used as a linear encoder, the code member 20 may take the form or configuration of a generally elongate, strip-like member 74, with the various reflectors 22 being arranged along a line, as best seen in FIG. 2. Alternately, if the optical encoder 10 is to be used as a rotary encoder, the code member 20 may take the form or configuration of a disc-like member or "wheel" 70, with the various reflectors 22 being arranged in a generally circular manner around the periphery of the wheel 70. See FIG. 3. Accordingly, the term "code member", as used herein, should not be regarded as limited to any particular shape or configuration of code member, but should instead be broadly construed to include a linear code strip, a circular code "wheel," or any other form or configuration of code member which may be required or desired in a particular application.

Figure 9:
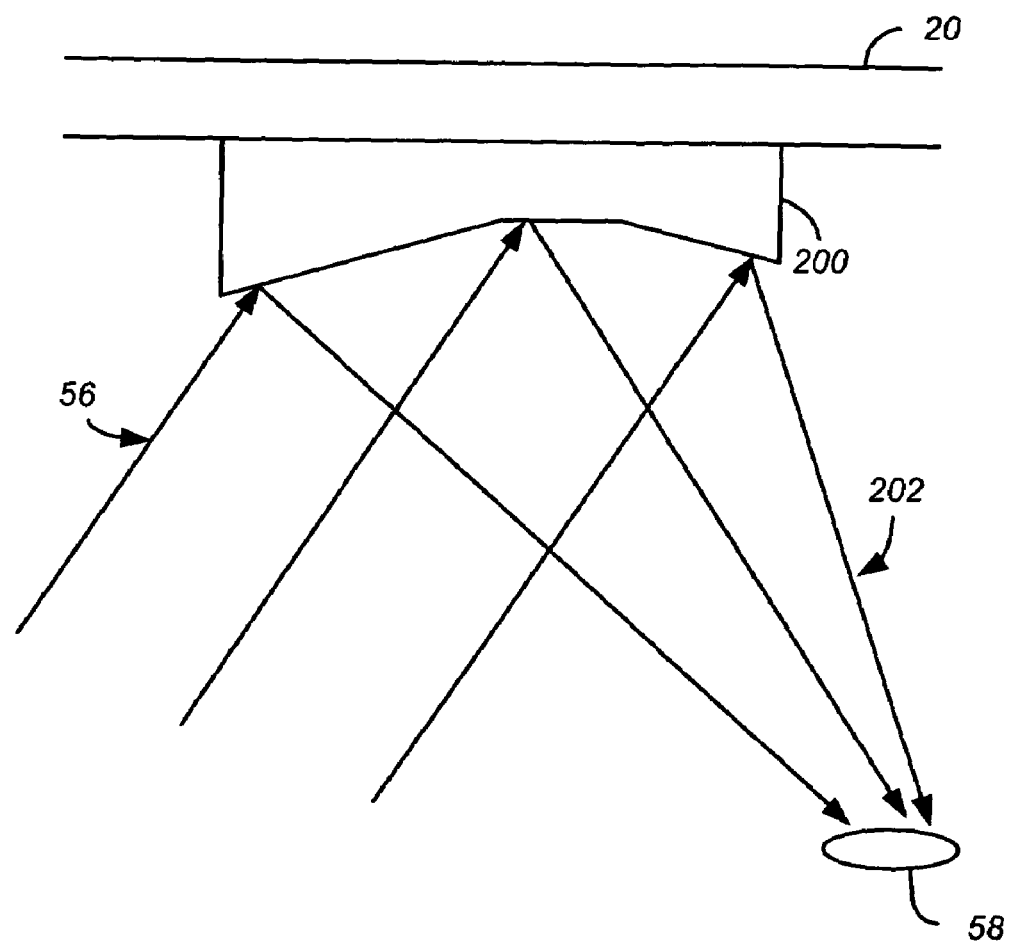
FIG. 9 illustrates an exemplary alternative surface contour for the reflectors shown in FIG. 1 or 7.

As previously mentioned, the code member 20 is provided with a plurality of reflectors 22. The reflectors 22 may comprise any of a wide range of shapes. As will be described in more detail later in this description, circular or elliptical shapes may enable the optical encoder 10 to produce one or more quasi-sinusoidal waveforms (e.g., output signals 52 and 54 from adders 40 and 42, respectively). Depending on the orientation and circumference of light 56 emitted by the light source 12, circular reflectors may sometimes enable the adders 40 and 42 to provide outputs 52 and 54 most closely matching true sinusoidal waveforms. However, reflectors that form ellipses in a direction 78 that is perpendicular to the displacement direction 24 can be useful in providing a greater quantity of light for the detector array 13 to sense (while still enabling the adders 40 and 42 to produce quasi-sinusoidal waveforms). Other ways of providing a greater quantity of light to the detector array 13 also exist. For example, the code member 20 may be provided with two or more sets of reflectors, corresponding ones of which are aligned in the direction 78 (e.g., each reflector 22 may be replaced with a pair of reflectors that are aligned in the direction 78). Alternately, or additionally, the reflectors 22 may be shaped to catch more light. One such shape 200 is shown in FIG. 9. As shown, the reflector's shape 200 tends to focus a broader beam of light 56, thereby causing a greater number of reflected rays 202 to form spot 58 than if a reflector merely had a flat surface (which many of the rays 56 would miss at any given moment in time—see FIG. 1).

Although the reflectors 22 may be variously shaped, it will be assumed for the remainder of this description that the reflectors 22 are flat and circular.

When each reflector 22 is aligned with the light beam 62 produced by the light source 12, the reflector 22 functions to reflect a narrowed beam 72 of light 80, as best seen in FIG. 1. The narrowed beam 72 results in the formation of a spot 58 on the detector array 13. See FIGS. 4 and 5. The size and shape of the reflectors 22 on the code member 20 define the size and shape of the narrowed beams 72, and thus the size and shape of the spots 58. If the beam 62 produced by the light source 12 and lens 80 is substantially collimated, the size and shape of the spots 58 may be approximately equal to the size and shape of the reflectors 22. For example, if the reflectors are circular or elliptical, the spots 58 should be circular or elliptical. However, if the beam 62 produced by the light source 12 is not collimated (e.g., if the lens 80 does not exist and the beam 62 comprises diverging light rays), then the size and shape of the reflectors 22 may differ from (e.g., be smaller than) the size and shape of the spots 58.

In order to provide the proper amount of spatial filtering, the dimension 26 of the spot 58 in the displacement direction 24 is preferably less than the width 28 of the detector set 14, but greater than the width 76 of a single detector element 16. Even more preferably, the dimension of the spot 58 in the displacement direction 24 is about 40% to about 80% of the width 28 of the detector set 14.

In addition to the size of the spot 58, the spacing between successive spots is preferably adjusted so that only a single spot 58 illuminates the detector array 13 at any given time. However, at least one spot 58 should always illuminate the detector array 13. To eliminate motion detection "gaps", when the code member 20 is moving but no spot 58 is moving across the detector array, it may sometimes be desirable to allow more than one spot 58 to illuminate the detector array 13 at the same time. However, in these cases, it is preferable to keep the multiple light spots to "about one" light spot 58. As defined herein, "about one" light spot is defined to be less than or equal to one-and-a-half (1½) light spots 58.

To adjust the size and spacing of light spots 58 illuminating the detector array 13, and for a given light source 12 and detector array 13, the positions (i.e., spacings) of the light source 12, the detector array 13 and the code member 20 may be adjusted. In addition, the size 26 and spacing 30 of the reflectors 22 in the code member 20 may be adjusted. If the light beam 62 is a collimated beam, then the positions (i.e., spacings) of the light source 12, the detector array 13 and the code member 20 may be somewhat less critical, with the size and spacing of the light spots 58 being about equal to the size 26 and spacing 30 of the reflectors 22 on the code member 20.

Figure 4:
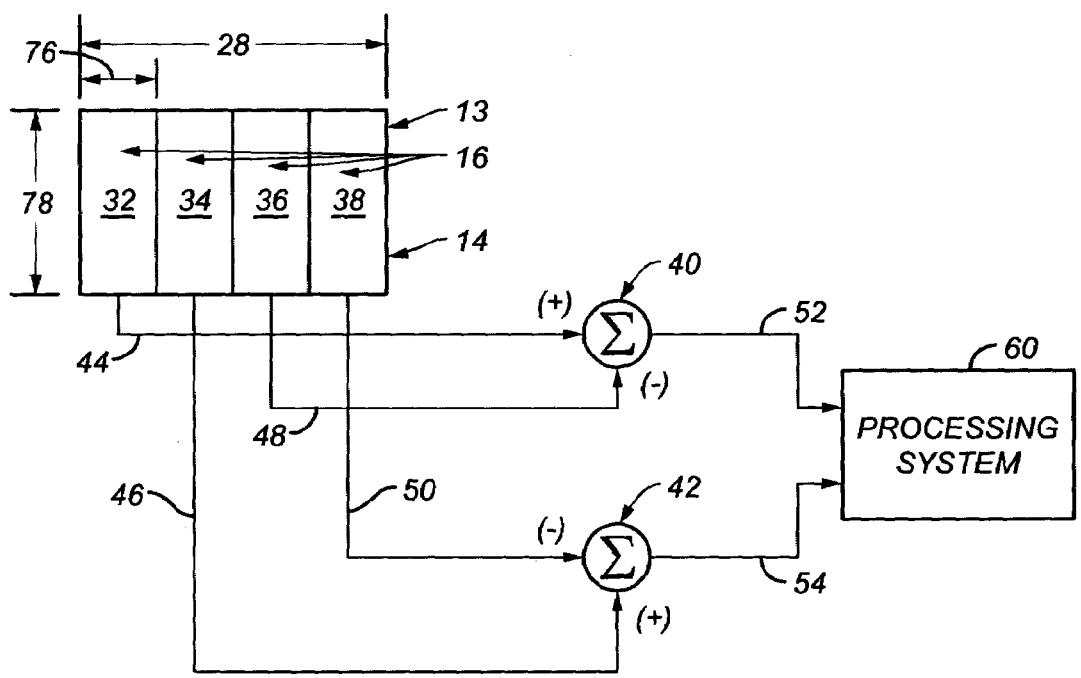
FIG. 4 is a schematic representation of the detector array shown in FIG. 1, showing how the individual detector elements thereof are connected to a pair of adders.
Figure 5:
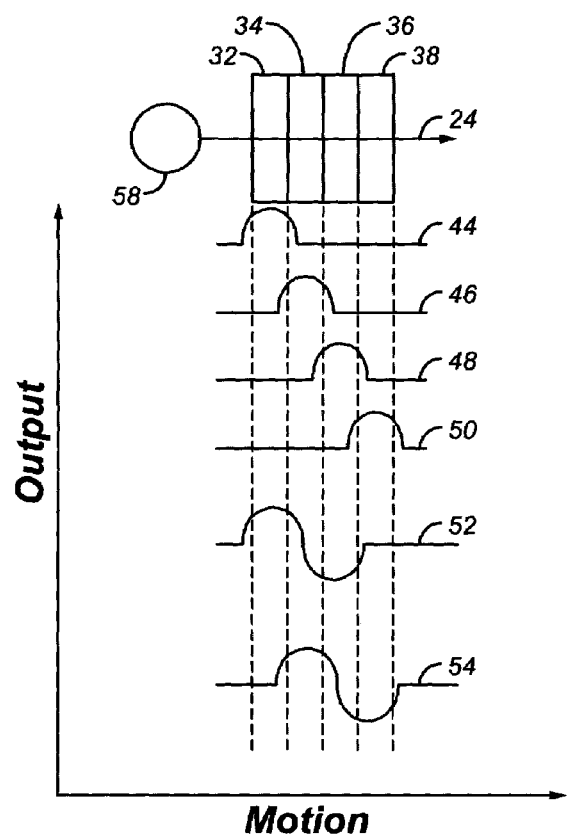
FIG. 5 is a graphical representation of the output signals produced by the detector elements of the detector array shown in FIG. 1, with the abscissa indicating movement of the spot along the detector array and the ordinate indicating the output of the various detector elements and adders.

Referring now primarily to FIGS. 4 and 5, the optical encoder 10 may further comprise first and second adders 40 and 42 that are connected to the various individual detector elements 16 forming the detector array 13, so that the individual detector elements 16 are "interdigitated". That is, alternating ones of the detector elements 16 may be connected to different ones of the adders 40 and 42. In this manner, the code member 20 and the detector array 13 form a "spatial filter". Also, if the reflectors 22 on the code member 20 are circular or elliptical, the outputs 52, 54 of the adders 40, 42 will comprise quasi-sinusoidal waveforms, as best seen in FIG. 5.

More specifically, the first adder 40 is operatively connected to the first detector element 32 and the third detector element 36, whereas the second adder 42 is operatively connected to the second detector element 34 and the fourth detector element 38. The first adder 40 combines the output signals of the first and third detector elements 32 and 36 by subtracting the output signal 48 of the third detector element 36 from the output signal 44 of the first detector element 32. The resulting output signal 52 of the first adder 40 comprises a quasi-sinusoidal waveform. See FIG. 5.

The second adder 42 combines the output signals of the second and fourth detector elements 34 and 38 by subtracting the output signal 50 of the fourth detector element 38 from the output signal 46 of the second detector element 34. The resulting output signal 54 of the second adder 42 comprises a quasi-sinusoidal waveform, as also best seen in FIG. 5.

A processing system 60 may be connected to the first and second adders 40 and 42 so that the processing system 60 is responsive to the output signals 52 and 54 produced by the first and second adders 40 and 42. The processing system 60 may then be operated to analyze the output signals 52 and 54 from the first and second adders 40 and 42 in order to derive information about the relative movement between the code member 20 and the detector array 13. For example, the processing system 60 may determine the velocity (i.e., speed) of the motion between the code member 20 and the detector array 13 by measuring the frequency of the quasi-sinusoidal waveform of either the output signal 52 from the first adder 40 or the output signal 54 from the second adder 42. The processing system 60 may also be used to determine the direction of motion between the code member 20 and the detector array 13, for example by measuring the phase difference or phase shift between the quasi-sinusoidal waveforms of the output signals 52 and 54. Of course, the processing system 60 may be used to determine other aspects of the relative motion between the code member 20 and the detector array 13 by, for example, integrating or differentiating the output signals 52 and 54.

By way of example, in one embodiment, the processing system 60 may comprise a general purpose programmable computer (e.g., a PC) that is programmed to sense the frequencies of the quasi-sinusoidal waveforms as well as their phase difference, to make desired calculations, and to produce desired output data. Alternately, the processing system 60 could comprise an application-specific integrated circuit (ASIC).

The optical encoder 10 may be operated as follows to detect relative movement between the code member 20 and the detector array 13. For example, in an arrangement wherein the code member 20 is mounted to a moveable component (not shown) and the detector array 13 remains stationary, light 56 from the light source 12 will reflect from a reflector 22 provided on the code member 20 before illuminating the detector array 13 at a spot 58. In one embodiment, the size of the spot 58 is substantially the same as the size of the reflector 22 provided on the code member 20. The relative movement between the code member 20 and the detector array 13 causes the spot 58 to be moved or scanned across the individual detector elements 32, 34, 36, 38 of the detector array 13. See FIG. 5.

As the spot 58 illuminates each detector element 32, 34, 36, 38, the illuminated detector element (or elements) produces an output signal that is related to the amount of light incident thereon. For example, and with reference to FIG. 5, the movement of the spot 58 across each successive detector element 32, 34, 36, 38 comprising the detector array 13 results in each detector element 32, 34, 36, 38 producing an output signal having a quasi-sinusoidal pulse. More specifically, the first, second, third, and fourth detector elements 32, 34, 36, 38 produce corresponding output signals 44, 46, 48, 50 comprising quasi-sinusoidal pulses, with each pulse being shifted (i.e., delayed in time) in a manner that corresponds to the movement of the spot 58 across the detector array 13.

The quasi-sinusoidal pulses output by the various detector elements 32, 34, 36, and 38 are combined by the first and second adders 40 and 42 to produce quasi-sinusoidal waveforms corresponding to output signals 52 and 54. More specifically, the first adder 40 subtracts the third output signal 48 from the first output signal 44 to produce the quasi-sinusoidal output signal 52 (i.e., the "I" channel), whereas the second adder 42 subtracts the fourth output signal 50 from the second output signal 46 to produce the quasi-sinusoidal output signal 54 (i.e., the "Q" channel).

The processing system 60 may then be used to analyze the output signals 52 and 54 from the first and second adders 40 and 42 to derive information relating to the relative movement of the code member 20 and the detector array 13. For example, the relative velocity or speed between the code member 20 and the detector array 13 may be determined by the processing system 60 based on a frequency of the output signal (e.g., 52 or 54) from one of the first and second adders 40 and 42. That is, the frequency of the quasi-sinusoidal waveform corresponding to the output signal 52 of the first adder 40 is related to the relative velocity between the code member 20 and the detector array 13. Likewise, the frequency of the quasi-sinusoidal waveform corresponding to the output signal 54 of the second adder 42 is also related to the relative velocity between the code member 20 and the detector array 13. Thus, a velocity or speed determination may be made by measuring the frequency of the output signal 52 of the first adder 40, the output signal 54 of the second adder 42, or various combinations thereof.

The direction of movement of the code member 20 with respect to the detector array 13 may be determined from the phase relationship or phase difference between the quasi-sinusoidal waveforms 52 and 54 of the first and second adders 40 and 42. More specifically, in the embodiment shown and described herein, the "I" and "Q" channels will be 90° out-of-phase. Therefore, if the "I" channel leads the "Q" channel by 90°, the relative motion between the detector array 13 and code member 20 will be in a first direction. If the "I" channel lags the "Q" channel by 90°, the relative motion between the detector array 13 and the code member 20 will be in a direction opposite the first direction. In addition, other information about the relative movement between the code member 20 and the detector array 13 may be determined by integrating or differentiating the output signals 52 and 54 produced by the adders 40 and 42.

Figure 7:
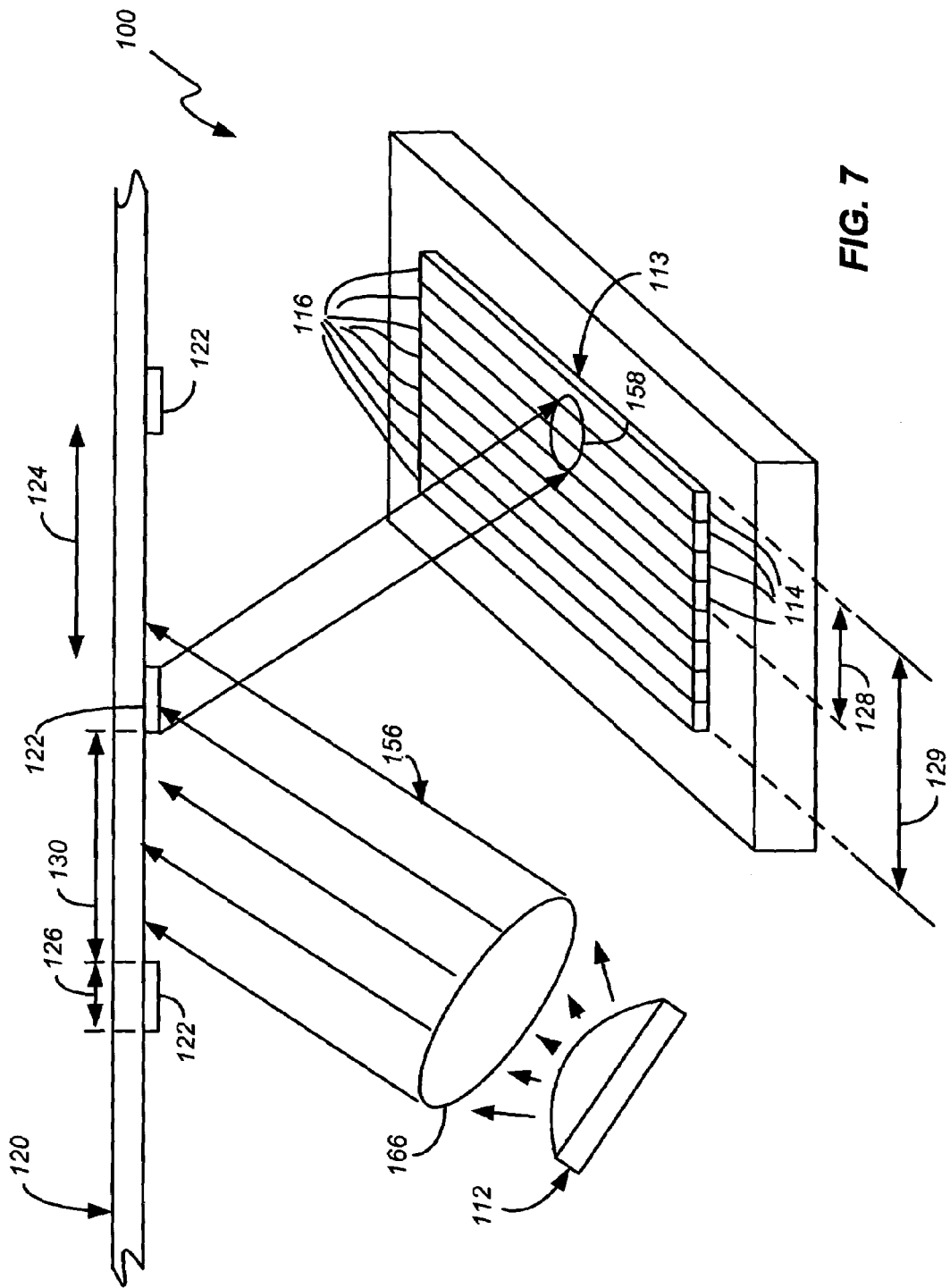
FIG. 7 is a perspective view of another embodiment of an optical encoder, wherein the encoder has a detector array comprising two detector sets.
Figure 8:
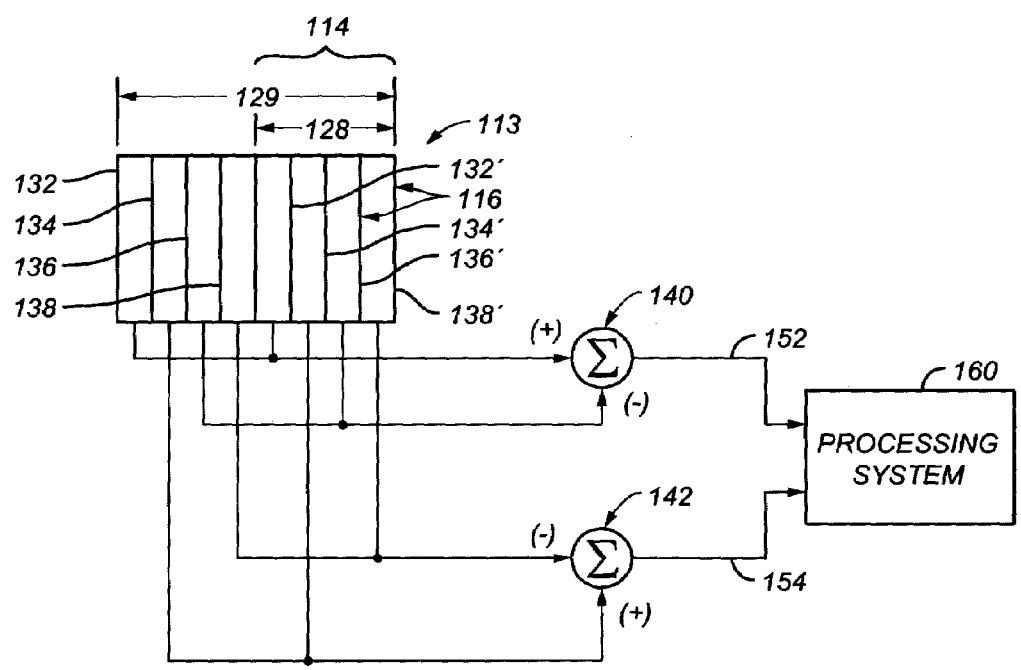
FIG. 8 is a schematic representation of the detector array shown in FIG. 7, showing how the individual detector elements thereof are connected to a pair of adders.

As mentioned above, the detector array 13 may comprise more than one individual detector set 14. Providing additional detector sets 14 can provide for increased spacing between the adjacent reflectors 22 provided in the code member 20, which can be advantageous in some circumstances. Referring now to FIGS. 7 and 8, a second embodiment 110 of an optical encoder comprises a light source 112 and a detector array 113 positioned on one side of a code member 120. The detector array 113 in this embodiment comprises two detector sets 114, each of which comprises four (4) individual detector elements 116. As with the code member 20, the code member 120 is provided with a plurality of reflectors 122.

When the light source 112 illuminates the code member 112, a light spot or spots 158 illuminate the detector array 113. In order to provide the proper amount of spatial filtering, the dimension of the spot 158 in the displacement direction 124 is preferably less than the width 128 of one detector set 114, but greater than the width of a single detector element 116. Even more preferably, the dimension of the spot 158 in the displacement direction 124 is about 40% to about 80% of the width 128 of one detector set 114.

In addition to the size of the spot 158, the spacing between successive spots is preferably adjusted so that only a single spot 158 illuminates the detector array 113 at any given time. However, at least one spot 58 should always illuminate the detector array 13. To eliminate motion detection "gaps" when the code member 120 is moving but no spot 158 is moving across the detector array, it may sometimes be desirable to allow more than one spot 158 to illuminate the detector array 113 at the same time. However, in these cases, it is preferable to keep the multiple light spots to "about one" light spot 158. As defined herein, "about one" light spot is defined to be less than or equal to one-and-a-half (1½) light spots 158.

To adjust the size and spacing of light spots 158 illuminating the detector array 113, and for a given light source 112 and detector array 113, the positions (i.e., spacings) of the light source 112, the detector array 113 and the code member 120 may be adjusted. In addition, the size 126 and spacing 130 of the reflectors 122 in the code member 120 may be adjusted. If the light source 112 is a collimated light source (or is directed into a collimating lens 166), then the positions (i.e., spacings) of the light source 112, the detector array 113 and the code member 120 may be somewhat less critical, with the size and spacing of the light spots 158 being about equal to the size 126 and spacing 130 of the reflectors 122 on the code member 120.

Referring now primarily to FIG. 8, the detector array 113 comprises a total of eight individual detector elements 116: first, second, third, and fourth detector elements 132, 134, 136, and 138, respectively, which together form a first detector set 114, and fifth, sixth, seventh, and eighth detector elements 132', 134', 136', and 138', respectively, which together form a second detector set 114. The various detector elements 116 are also "interdigitated." More specifically, the first and fifth detector elements 132 and 132' are connected together and to a first adder 140. The third and seventh detector elements 136 and 136' are connected together and to the first adder 140. The first adder 140 combines the signals from the detectors in the manner already described for the adder 40 of the first embodiment 10. That is, the first adder 140 subtracts the combined signals from the third and seventh detectors 136 and 136' from the combined signals from the first and fifth detector elements 132 and 132' to produce a quasi-sinusoidal output signal 152.

The second and sixth detector elements 134 and 134' are connected together and to a second adder 142. The fourth and eighth detector elements 138 and 138' are connected together and to the second adder 142 in the manner illustrated in FIG. 8. The second adder 142 combines the signals from the various detectors in the manner already described for the adder 42 of the first embodiment 10. That is, the second adder 142 subtracts the combined signals from the fourth and eighth detector elements 138 and 138' from the combined signals from the second and sixth detector elements 134 and 134' to produce a quasi-sinusoidal output signal 154.

A processing system 160, operatively connected to the first and second adders 140 and 142, processes the first and second quasi-sinusoidal signals 152 and 154 in the manner already described to produce information relating to the relative movement of the code member 120 and detector array 113.

Figure 6A:
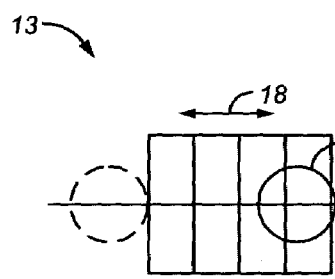
FIG. 6(*a*) is a schematic representation of the path of the FIG. 1 light spot along a displacement direction that is substantially parallel to the width dimension of the detector array.
Figure 6B:
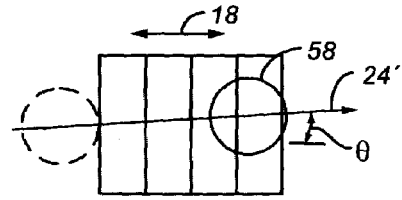

In most applications, the optical encoders 10 and 110 may be used to produce quasi-sinusoidal output signals without the need to utilize a separate reticle. Besides adding to an encoder's component count, a separate reticle is difficult to properly align. In addition, the spatial filters formed by the combinations of the detector arrays, and the reflectors on the code members 20 and 120, provide for increased resolution over conventional encoder designs. The code members 20 and 120 and spatial filters of the optical encoders 10 and 110 also enable the optical encoders 10 and 110 to better tolerate misalignments of the code members 20 and 120 and detector arrays 13 and 113. For example, and referring to FIGS. 6(a) and 6(b), it is generally desirable for the displacement direction 24 to be generally parallel to the width direction 18 of the detector array 13, as best seen in FIG. 6(a). However, the optical encoder 10 of the present invention will provide satisfactory operation even in the case of a non-parallel displacement direction 26' (i.e., even though the displacement direction 26' may be tilted or inclined with respect to the width direction 18 of the detector array 13 by an angle $\Theta$). Such non-parallel alignment may be the result of accumulated tolerance errors or other misalignments that may occur during production or operation.

What is claimed is:

1. An optical encoder, comprising:
   a code member having a plurality of reflectors thereon;
   a light source, positioned to illuminate an area of the code member comprising at least one of the reflectors; and
   a detector array comprising at least one detector set, each of the at least one detector set comprising a plurality of detector elements, the code member and the detector array being moveable with respect to one another along a displacement direction;
   wherein, as the code member moves with respect to the detector array, the reflectors on the code member reflect light emitted by the light source to produce light spots that travel across the detector array;
   wherein the light source, the detector array and the code member are positioned, and the reflectors on the code member are sized, to cause the light spots to have dimensions along the displacement direction that are less than a width of one of the detector sets, but greater than a width of one of the detector elements.

2. The optical encoder of claim 1, wherein the light source, the detector array and the code member are positioned, and the reflectors on the code member are spaced, to cause about one light spot to illuminate the detector array at a time.

3. The optical encoder of claim 1, wherein the light source, the detector array and the code member are positioned, and the reflectors on the code member are spaced, to cause only one light spot to illuminate the detector array at a time.

4. The optical encoder of claim 1, wherein the light source, the detector array and the code member are positioned, and the reflectors on the code member are sized, to cause the light spots to have dimensions along the displacement direction in a range of about 40% to about 80% of a width of one of the detector sets.

5. The optical encoder of claim 1, wherein: the light source is a collimated light source; and each of the reflectors on the code member has a dimension along the displacement direction that is less than a width of one of the detector sets, but greater than a width of one of the detector elements.

6. The optical encoder of claim 5, wherein each of the reflectors on the code member is separated from an adjacent reflector by a distance that is about equal to a width of the detector array.

7. The optical encoder of claim 1, wherein: the light source is a collimated light source; and each of the reflectors on the code member has a diameter along the displacement direction in a range of about 40% to about 80% of a width of one of the detector sets.

8. The optical encoder of claim 1, wherein the light source comprises a light emitting diode.

9. The optical encoder of claim 1, wherein each of the detector elements comprises a photodiode.

10. The optical encoder of claim 1, wherein the at least one detector set comprises a first detector set, the first detector set comprising first, second, third and fourth detector elements positioned in adjacent relationship; the optical encoder further comprising:
    a first adder, operatively associated with the first detector element and the third detector element to subtract an output signal produced by the third detector element from an output signal produced by the first detector element, thereby generating a first output; and
    a second adder, operatively associated with the second detector element and the fourth detector element to subtract an output signal produced by the fourth detector element from an output signal produced by the second detector element, thereby generating a second output.

11. The optical encoder of claim 10, wherein:
    the at least one detector set further comprises a second detector set, the second detector set comprising fifth, sixth, seventh and eighth detector elements positioned adjacent the detector elements of the first detector set;
    the first adder adds to its output an output signal produced by the fifth detector element less an output signal produced by the seventh detector element; and
    the second adder adds to its output an output signal produced by the sixth detector element less an output signal produced by the eighth detector element.

12. The optical encoder of claim 10, further comprising a processing system that is operatively associated with the first and second adders, the processing system determining a speed of relative movement between the code member and the detector array based on a frequency of an output signal from one of the first and second adders.

13. The optical encoder of claim 10, further comprising a processing system that is operatively associated with the first and second adders, the processing system determining a direction of relative movement between the code member and the detector array based on a phase difference between the respective first and second outputs of the first and second adders.

14. The optical encoder of claim 1, wherein the code member comprises an elongate member, and wherein the plurality of reflectors on the code member are positioned along a line.

15. The optical encoder of claim 1, wherein the code member comprises a disc-like member, and wherein the plurality of reflectors on the code member are positioned around a periphery of the disc-like member.

16. The optical encoder of claim 1, wherein the reflectors are circular or elliptical shaped.

17. The optical encoder of claim 1, wherein the light source illuminates an area larger than one of the reflectors.

18. A method, comprising:
    providing a code member having a plurality of reflectors thereon;
    positioning a light source on one side of the code member, the light source producing a beam of light that illuminates an area of the code member comprising at least one of the reflectors;
    positioning a detector array on a same side of the code member as the light source, the detector array comprising at least one detector set, and each detector set comprising at least four detector elements, the detector array being moveable with respect to the code member along a displacement direction;
    wherein the reflectors on the code member produce light spots that travel across the detector array as the code member moves with respect to the detector array; and
    combining output signals from at least a first pair of non-adjacent detector elements of the detector array to produce a first quasi-sinusoidal signal;

wherein the light source, the code member and the detector array are positioned, and the reflectors on the code member are sized and spaced, to cause the reflectors on the code member to produce light spots on the detector array that i) have dimensions along the displacement direction that are less than a width of one of the detector sets, but greater than a width of one of the detector elements, and ii) are separated from adjacent light spots by distances that are about equal to a width of the detector array.

19. The method of claim 18, wherein the code member is provided with reflectors that are circular or elliptical shaped.

20. The method of claim 18, further comprising, determining a speed of relative movement between the code member and the detector array based on a frequency of the first quasi-sinusoidal signal.

21. The method of claim 18, wherein combining the output signals from at least the first pair of non-adjacent detector elements comprises subtracting the output signals from each other.

22. The method of claim 18, further comprising, combining output signals from at least a second pair of non-adjacent detector elements to produce a second quasi-sinusoidal signal, the second pair of non-adjacent detector elements being interdigitated with the first pair of non-adjacent detector elements.

23. The method of claim 22, further comprising, determining a direction of relative movement between the code member and the detector array based on a phase difference between the first and second quasi-sinusoidal signals.

24. The method of claim 22, wherein combining the output signals from at least the second pair of non-adjacent detector elements comprises subtracting the output signals from each other.

25. An optical encoder, comprising:
a code member having a plurality of reflectors thereon;
a light source, positioned to illuminate an area of the code member comprising at least one of the reflectors; and
a detector array comprising at least one detector set, each of the at least one detector set comprising a plurality of detector elements, the code member and the detector array being moveable with respect to one another along a displacement direction; wherein, as the code member moves with respect to the detector array, the reflectors on the code member reflect light emitted by the light source to produce light spots that travel across the detector array;
wherein the light source, the detector array and the code member are positioned, and the reflectors on the code member are sized, to cause the light spots to have dimensions along the displacement direction in a range of about 40% to about 80% of a width of one of the detector sets.

26. An optical encoder, comprising:
a code member having a plurality of reflectors thereon;
a light source, positioned to illuminate an area of the code member comprising at least one of the reflectors; and
a detector array comprising at least one detector set, each of the at least one detector set comprising a plurality of detector elements, the code member and the detector array being moveable with respect to one another along a displacement direction; wherein, as the code member moves with respect to the detector array, the reflectors on the code member reflect light emitted by the light source to produce light spots that travel across the detector array;
wherein: the light source is a collimated light source; and each of the reflectors on the code member has a dimension along the displacement direction that is less than a width of one of the detector sets, but greater than a width of one of the detector elements.

27. An optical encoder, comprising:
a code member having a plurality of reflectors thereon;
a light source, positioned to illuminate an area of the code member comprising at least one of the reflectors; and
a detector array comprising at least one detector set, each of the at least one detector set comprising a plurality of detector elements, the code member and the detector array being moveable with respect to one another along a displacement direction; wherein, as the code member moves with respect to the detector array, the reflectors on the code member reflect light emitted by the light source to produce light spots that travel across the detector array;
wherein: the light source is a collimated light source; and each of the reflectors on the code member has a diameter along the displacement direction in a range of about 40% to about 80% of a width of one of the detector sets.

* * * * *